3,134,823
PROCESS INVOLVING THE REACTION OF GROUP
I–B METAL COMPOUNDS WITH AN ORGANO-
BORON COMPOUND IN THE PRESENCE OF A
STRONG BASE
Herbert C. Brown, 1840 Garden St., West Lafayette, Ind.
No Drawing. Filed Dec. 12, 1960, Ser. No. 75,110
15 Claims. (Cl. 260—676)

The present invention is concerned with a novel method for generating free radicals and, more specifically, relates to a coupling reaction.

It has long been known that free radicals can be generated by involved and carefully controlled conditions of temperature and pressure during cracking of various hydrocarbons. It is also well known that free radicals are almost always incapable of existence over extended periods of time, even seconds, and generally a coupling reaction results. Somewhat more convenient methods for the generation of free radicals and the ensuing coupling reactions have been investigated including the reaction of certain metal salts with certain organometallics, especially the Grignard reagent and organolithium compounds with silver salts. It has also been shown that certain alkyl boronic acids can be reacted at elevated temperatures with ammoniacal silver oxide (Tollens reagent) to effect a coupling reaction. These procedures have been primarily of academic interest because of the low yields obtained, the various side reactions encountered, and the close control required. A more convenient and practical method for the generation of free radicals is highly desirable since the ultimate coupled products have considerable utility, and when the free radicals are generated in the presence of other externally acting moieties, additional and diverse practical uses other than simple coupling is possible as brought forth hereinafter.

Therefore, an object of this invention is to provide a new and efficient method for the generation of free radicals. Another object is to provide a more efficient method for obtaining coupled organic, especially hydrocarbon, products in higher yield and purity. A still further object is to provide a new and more efficient method for the generation of free radicals, especially hydrocarbon free radicals which are simultaneously reacted with other compounds providing additional and diverse uses for the new method of generating free radicals. Other objects of this invention will be evident as the discussion proceeds.

It has now been found that the above and other objects of this invention can be accomplished more advantageously by the reaction of uncomplexed inorganic compounds of a group I–B metal with an organoboron compound having at least one boron to carbon linkage in the presence of a strong base. Such strong bases can be, for example, the hydroxides, alkoxides, amides or alkyls of group I–A and II–A metals or the quaternary ammonium hydroxides. It has been found that the designated strong bases must be present in order for an effective and efficient reaction to be obtained. In a particular embodiment of the invention, the trialkylboranes, especially wherein the alkyl groups contain up to and including about 8 carbon atoms, the group I–B metal nitrates, especially silver nitrate, and the alkali metal hydroxides, especially sodium hydroxide, are employed. While it is not necessary to employ a solvent during the reaction, some advantage is achieved, particularly when protonic solvents such as the alcohols or water, especially the latter, are employed. It has also been found that best results are obtained at temperatures between about 0 to 100° C. Therefore, a particularly preferred embodiment of the invention comprises the reaction of a trialkylborane wherein each alkyl group contains up to and including about 8 carbon atoms with silver nitrate and sodium hydroxide in the presence of water.

The present invention provides a novel and more efficient method for generating free radicals in a rapid and high yield. In contrast to the prior art methods, higher yields of the free radicals are obtained as illustrated, for example, in the resulting coupled products. Further, the conditions employable are subject to considerable latitude obviating many of the disadvantages of the prior art techniques. By way of example, the process is eminently suitable toward water and methanolic systems and indeed water or methanol are preferred solvents. Additionally, for the first time, a method for generating free radicals from trihydrocarbon boranes has now been made possible in high yield in a more efficient manner than obtained in the previously known reaction of certain alkane boronic acids with ammoniacal silver. The specific objectional feature of using the explosive ammoniacal silver of the prior art is also obviated. Indeed, the present invention is more advantageously conducted in the absence of ammonia or ammoniacal-forming solutions since, as will be illustrated below, such solutions retard the generation of the free radicals.

The operational procedures employed in conducting the process are subject to considerable latitude. Basically, all that is required is to provide a mixture of the organoboron compound, the group I–B metal compound, and the strong base in the presence of a solvent, if desired. The mixture is then caused to react by heating, if necessary, forming the coupled reaction product or, in other embodiments of this invention wherein other reagents can be present as brought forth hereinafer, forming other diverse products.

The novel process is more adequately illustrated by the following examples wherein all parts are by weight unless otherwise specified.

EXAMPLE I

In numerous runs, silver oxide was weighed into a reaction flask. Then, 2 ml. of water and a Teflon magnetic stirring bar were added to the flask. The reaction flask was attached to a vacuum line, frozen with liquid nitrogen and evacuated to about $10^{-5}$ mm. of mercury. The reaction flask was then closed from the vacuum line by means of a mercury float valve and was allowed to warm to room temperature. This procedure was repeated in order to degas the water. Then, triethylborane in prescribed amount was condensed into the reaction flask with liquid nitrogen. The reaction mixture was warmed to room temperature while agitating and the pressure of the system observed on a mercury monometer and recorded with time. The time of maximum reaction as indicated by the pressure was noted and at the end of the total reaction time, the mixture was distilled through a Dry Ice trap from a Dry Ice bath into a standard bulb. The gases obtained were analyzed in a Perkin-Elmer vapor fractometer through a 30 foot silver nitrate-benzyl cyanide on chromosorb column.

The results obtained by these runs are illustrated in the following table:

Table I

| Run No. | BEt₃, mmoles | Ag₂O, mmoles | NaOH, mmoles | Reax., Max. hours | $C_4H_{10}$ | $C_2H_4$ | $C_2H_6$ | Total | Total Hours |
|---|---|---|---|---|---|---|---|---|---|
| | | | | | (Conversion Percent) | | | | |
| I | 1.04 | 1.60 | 0 | | 9 | 5 | 15 | 29 | 18 |
| II | 0.930 | 1.48 | 0.50 | 0.1 | 49 | 7 | 9 | 65 | 21 |
| III | 0.982 | 1.51 | 1.08 | 0.1 | 63 | 12 | 11 | 86 | 16 |
| IV | 1.03 | 1.54 | 2.16 | 0.1 | 65 | 11 | 10 | 86 | 16 |
| V | 1.03 | 1.54 | 3.04 | 0.1 | 73 | 9 | 8 | 90 | 18 |
| VI | 1.00 | 1.49 | 6.08 | 0.1 | 72 | 8 | 10 | 90 | |

The above table illustrates many important facets of the present invention. For example, it is to be noted that in the absence of any of the strong base, sodium hydroxide, run I, very poor conversion to n-butane was obtained whereas in the presence of strong base, the conversion to n-butane is multiplied many-fold. Further, it is to be noted that the conversion is enhanced as the moles of base per boron to carbon bond, i.e. equivalents, are increased to be at least 1:1. A maximum in yield of n-butane is obtained illustrating that a least a 1:1 mole ratio of the base to the boron to carbon bonds is more effective.

EXAMPLE II

In numerous runs, a solution of 49.8 mmoles of 1-hexene and 14.62 mmoles of n-nonane (internal standard for analysis by gas chromatography) in 15 ml. of diglyme (the dimethyl ether of diethylene glycol) was hydroborated with 10 percent excess diborane. After the mixture was stirred for 1 hour, at room temperature, hydrolysis with 40 ml. of distilled water produced an evolution of about 70 ml. of hydrogen. The hydrolysate, now comprising tri-n-hexylborane in water, was cooled to 0–5° C. and a solution of 50 mmoles of silver nitrate in 20 ml. of distilled water was added all at once. With the mixture at a temperature between 0–5° C., a solution of the prescribed amount of sodium hydroxide in 20 ml. of distilled water was added over an indicated period. In each instance, the reaction mixture was stirred for 2 hours while maintaining the temperature at 0–5° C. The results obtained are illustrated in the following table.

cally diminished, compare runs V and VI with runs II through IV.

EXAMPLE III

The procedure of Example II was repeated essentially as described with exception that the reaction temperature employed for the coupling was —5° to —10° C. and 100 mmoles of sodium hydroxide was employed. The conversion to dodecane was 73 percent with a 15 percent conversion to hexane and hexene.

EXAMPLE IV

Example III was repeated essentially as described with exception that in this instance an equivalent amount of potassium hydroxide was substituted for sodium hydroxide and the reaction temperature was maintained at 0 to 6° C. In this instance, a 70 percent conversion to dodecane, 15 percent conversion to hexane, and a 6 percent conversion to hexene was obtained.

EXAMPLE V

Example II was repeated essentially as described with exception that in this instance 100 mmoles of sodium hydroxide and 50 mmoles of silver nitrate were employed, the reaction temperature was maintained between 0 to 7° C., and the solvent system comprised 30 ml. of the dimethyl ether of diethylene glycol, 40 ml. water, and 40 ml. methanol. In this instance, a 65 percent conversion to dodecane, 12.5 percent conversion to hexane, and 6 percent conversion to hexene was obtained.

In a similar run wherein the methanol was substituted with an equal amount of ethylene glycol, a 43 percent

Table II

| Run No. | Coupling Reagents (mmoles) | Addition Time (min.) | Solvent System (ml.) | Conversion | | | |
|---|---|---|---|---|---|---|---|
| | | | | Percent $C_{12}$ | Percent hexane | Percent hexene | Percent Total |
| I | AgNO₃(50), (alone) | | DG*(30), H₂O(80) | 0 | (8) | | 8 |
| II | AgNO₃(50), NaOH(50) | 7 | DG(30), H₂O(80) | 25 | (25) | | 50 |
| III | AgNO₃(50), NaOH(100) | 10 | DG(30), H₂O(80) | 71 | (16) | | 87 |
| IV | AgNO₃(50), NaOH(200) | 15 | DG(30), H₂O(80) | 73 | (14) | | 87 |
| V | AgNO₃(50), NaOH(100) | 5 | DG(30), H₂O(80), H₂NC₂NH₄N₂(50) | 8 | 4 | 2 | 14 |
| VI | AgNO₃(50), NaOH(100) | 7 | DG(30), H₂O(80), NH₃(100) | 9 | 3 | 1.5 | 13.5 |

*Diglyme.

The above table illustrates that in the presence of the sodium hydroxide, the yield of coupling product, dodecane, is many-fold enhanced, compare run I with runs II through IV. The table also illustrates that when employing a group I–B compound other than an oxide or hydroxide, best results are obtained when at least one molar equivalent of the base, here alkali hydroxide, is present for each mole of the group I–B metal compound and each boron to carbon bond in the organoborane compound. The table also illustrates that the presence of ammonia or ethylenediamine, complexing agent for silver ion is deleterious, even in the presence of the alkali metal hydroxide since the yield of the desired dodecane is radically conversion to dodecane, 11 percent conversion to hexane, and 3 percent conversion to hexene was obtained.

EXAMPLE VI

When Example II was repeated with exception that an equivalent amount of tetrahydrofuran was substitiuted for the dimethyl ether of diethylene glycol, 50 mmoles of silver nitrate, and 100 mmoles of sodium hydroxide were employed, a 64 percent conversion to dodecane was obtained.

EXAMPLE VII

The procedure of Example II was used with exception that 100 mmoles of sodium hydroxide and 50 mmoles of silver nitrate were used in each instance, essentially equivalent amounts of the dimethyl ether of diethylene glycol and water were used, but the reaction temperature was maintained in duplicate runs between 0 to 7° C., 25 to 35° C., 35 to 45° C., 65 to 75° C., and 90 to 100° C. For all practical purposes, essentially equivalent conversions to dodecene were obtained with the highest conversions being between 0 to 35° C.

EXAMPLE VIII

Employing the procedure of Example II, 16.7 mmoles of tri-n-hexylborane were reacted with 50 mmoles of silver nitrate in the presence of 100 mmoles of potassium hydroxide and 100 ml. of methanol at 0 to 6° F. for 2 hours. A 33 percent conversion to dodecane was obtained.

EXAMPLE IX

In a series of runs conducted essentially as described in Example II, the following illustrative data were obtained over a reaction time of 20 hours, noting in certain instances the period for maximum reaction using 2 ml. of solvent and room temperature reaction.

*Table III*

| Run No. | BEt$_3$ (mmoles) | AgNO$_3$ (mmoles) | NaOH (mmoles) | Reax. Max. (Hrs.) | Solvent | Products C$_4$H$_{10}$ Percent conversion | C$_2$H$_4$ | C$_2$H$_6$ | Overall |
|---|---|---|---|---|---|---|---|---|---|
| I | 1.05 | 4 | 4 | | H$_2$O | 66 | 8 | 18 | 92 |
| II | 1.0 | 4 | 4 | 0.5 | H$_2$O | 63 | 8 | 10 | 81 |
| III | 1.0 | 4 | 4 | 1.5 | CH$_3$OH | 73 | 6 | 8 | 87 |
| IV | 1 | 4 | 4 | | Benzene | 39 | 4 | 26 | 69 |
| V | 1.0 | 4 | 4 | | CCl$_4$ | 12 | 5 | 7 | [1]60 |
| VI | 1 | 4 | 4 | 12 | Diglyme | 63 | 5 | 19 | 87 |
| VII | 1 | 4 | 4 | 2 | Diglyme-H$_2$O | 50 | 9 | 15 | 74 |
| VIII | 1 | 4 | 4 | | t-butylbenzene | 44 | 5 | 18 | 67 |

[1] 36% conversion to EtCl also obtained.

The above table particularly illustrates the most desirable results obtained when using protonic type solvents such as water and the alcohols. The above data further indicate the advantages and practical results of mixing water with other solvents, particularly diglyme. The results with carbon tetrachloride illustrate the effect of utilizing a solvent which is readily attacked by free radicals.

The above table illustrates additional embodiments of the invention as well as certain preferred embodiments wherein the silver compound is the nitrate, sulfate, oxide, or acetate.

EXAMPLE XI

In this run, a solution of 50 mmoles of 3-methylpentene-1 in 15 ml. diglyme was hydroborated at room temperature with a 10 percent excess of diborane to form tri(3-methylpentyl)borane. The resulting mixture was hydrolyzed with 40 ml. of water to remove the unreacted diborane and then cooled to 0 to 5° C. and 20 ml. of 2.5 N silver nitrate was then added. Then, while maintaining the mixture at a temperature of 0 to −3° C., 20 ml. of a 5.0 N sodium hydroxide solution was added over a period of 11 minutes. No temperature surge was noted and the mixture was stirred for 5 hours at 0 to 5° C. The mixture was then reacted with stirring overnight at ambient temperature. In this manner, a good yield of the corresponding C$_{12}$ hydrocarbon, 4,7-dimethyldecane, was obtained.

EXAMPLE XII

In duplicate examples using 16.7 mmoles of tri-n-hexylborane keeping all variables constant with exception of varying the amount of silver salt employed, the following results were obtained.

*Table V*

| Run No. | Coupling Reagents (mmoles) | Add'n Time (min.) | Reax. Time (Hr.) | Reax. Temp. | Solvent System (ml.) | Conversion, Percent C$_{12}$ |
|---|---|---|---|---|---|---|
| I | AgNO$_3$(25), NaOH(100) | 15 | 1.5 | 0-7 | DG(30), H$_2$O(20) | 35 |
| II | AgNO$_3$(50), NaOH(100) | 15 | 2 | 0-9 | DG(30), H$_2$O(20) | 70 |
| III | AgNO$_3$(55), NaOH(100) | 10 | 2 | 0-9 | DG(30), H$_2$O(82) | 68 |
| IV | AgNO$_3$(75), NaOH(100) | 15 | 2 | 0-9 | DG(30), H$_2$O(20) | 60 |

EXAMPLE X

Again employing the procedure essentially as described in Example II, a series of runs were made using different silver compounds when reacting 1 mole of triethylborane with 4 moles of the silver compound and 4 moles of sodium hydroxide in the presence of 2 ml. of water over a total reaction time of 20 hours, but noting the period at which maximum reaction took place. The results obtained are set forth in the following table:

*Table IV*

| Run No. | Silver Salt | Reax., Max. Hrs. | Products C$_4$H$_{10}$ Percent Conversion | C$_2$H$_4$ | C$_2$H$_6$ | Overall |
|---|---|---|---|---|---|---|
| I | AgOAc | 0.5 | 58 | 11 | 10 | 79 |
| II | Ag$_2$O | 0.5 | 58 | 15 | 10 | 83 |
| III | AgBr | 1.0 | 8 | 5 | 10 | 23 |
| IV | Ag$_2$SO$_4$ | 0.5 | 66 | 10 | 8 | 84 |
| V | AgNO$_3$ | 0.5 | 63 | 8 | 10 | 81 |

The results in Table V illustrate that best results are obtained when at least 4 moles of the silver salt are employed per mole of the triorganoboron compound.

EXAMPLE XIII

When essentially 1 mole of silver hydroxide and 0.3 mole of triethylboron are reacted with 1.5 moles of barium hydroxide employing an equal volume of amyl alcohol as a solvent, at 30° C., n-butane is obtained in high yield.

When the above example is repeated substituting other alcohols as, for example, methanol, 2-propanol, n-butanol, t-butanol, octanol, cyclohexanol, and the like, equally satisfactory results are obtained.

EXAMPLE XIV

A good conversion to hexadecane is obtained when essentially 4 moles of lithium isoamylate dissolved in 20 parts of diglyme is added to a mixture of essentially 1.5 moles of cupric chloride and 1 mole of trioctylborane with the reaction being conducted for 2 hours at 40° C. Similar results are obtained when the above example is repeated substituting tridecylborane, tridodecylborane, triisooctylborane, and the like trialkylboranes and when substituting cuprous chloride, auric chloride, silver fluoride, silver iodide, and the like group I–B metal compounds.

EXAMPLE XV

Employing the procedure of Example II, essentially 1 mole of tricyclohexylborane is reacted with 4 moles of silver naphthenate and 4 moles of calcium hydroxide at 50° C. in 100 parts of a 50–50 mixture of water and dioxane. A good conversion to bicyclohexyl is obtained.

Equally satisfactory results are obtained when silver octanoate, copper laurate, copper octanoate, silver phenolate, silver benzoate, and the like are substituted for silver naphthenate and tricyclopentylborane and tricycloheptylborane are substituted for tricyclohexylborane in the above example.

EXAMPLE XVI

Butadiene is formed when silver carbonate is reacted with sodium hydroxide and the equimolar complex of trivinylborane with triethylamine employing the diethyl ether of diethylene glycol as a solvent at 25° C.

Equally satisfactory results are obtained when the above example is repeated substituting silver fluoroborate, silver acetate, silver trifluoroacetate, silver sulfate, silver oxide, and silver fluorophosphate for silver carbonate and tri-1-hexenylborane-trimethylamine complex, tricyclohexenylborane, trioctenylborane-pyridine complex, and the like triethylenically-unsaturated boranes.

EXAMPLE XVII

Dodecyl-1,11-diyne is obtained in good conversion when silver nitrate is reacted with tri-5-hexynylborane and cesium hydroxide according to the procedure of Example II at 30° C.

One can substitute tripropynylborane-triethylamine complex, tri-1-heptynylborane-dimethylaniline complex, and the like triacetylenic boranes in the above example to achieve a good conversion to compounds having two acetylenic linkages.

EXAMPLE XVIII

Treatment of 50 mmoles of triphenylborane with 100 mmoles of sodium isopropoxide and 50 mmoles of silver nitrate in diglyme results in the formation of diphenyl in good yield.

Similar results are obtained when other aryl boron reactants are employed as, for example, tritolylborane, trinaphthylborane, and the like. When sodium ethylate, lithium octylate, calcium butylate, sodium amide, ethyl sodium, amyllithium, tetraethylammonium hydroxide, tetrapropylammonium hydroxide, and the like strong bases are substituted for sodium isopropoxide in the above example, diphenyl is again formed in good yield.

EXAMPLE XIX

Essentially 1 mole of diethylboron chloride is reacted with 2 moles of silver hydroxide and 3 moles of sodium hydroxide in 100 parts of an 80–20 mixture of the dimethyl ether of diethylene glycol and water at 35° C. A good conversion to n-butane is obtained.

Good yields of the corresponding products are obtained when dihexyl boron iodide, hexyl boronic acid, diethylboron hydride, ethylboron dichloride, diphenylboron bromide, and the like are substituted for diethylboron chloride in the above example. While in these instances hydrolysis to the corresponding boronic and borinic acids generally occurs, such does not deter from the applicability of these compounds in the present invention.

It is not necessary that single organoboron reactants or organoboron compounds having only similar hydrocarbon moieties attached to the boron be employed. The following example will illustrate one such embodiment of this invention wherein a mixture of organoboron compounds is employed.

EXAMPLE XX

In this run, 0.5 mole of triethylborane and 0.5 mole of tripropylborane are reacted with 4 moles of silver nitrate and 4 moles of sodium hydroxide employing 50 parts of 80–20 mixture of water and the dimethyl ether of diethylene glycol as the diluent and room temperature for 3 hours. A good conversion to n-pentane (36%) as the principal product is obtained with smaller amounts of butane (18%) and hexane (18%).

Similar results were obtained when tri-n-hexylborane was reacted with (a) tri-n-pentylborane, (b) tri-2-methyl-1-butylborane, (c) tricyclopentylborane, and (d) tri-3-methyl-2-butylborane. Furthermore, by using a large excess of one organoborane, $R_3B$ such as tri-n-hexylborane, it is possible to convert the organo groups of a second organoborane, $R'_3B$ such as tri-n-pentylborane into the desired product R–R', e.g. n-undecane, in higher yields.

EXAMPLE XXI

A solution of 50 mmoles of 2-methyl-1-pentene and 16.12 mmoles of n-nonane in 13 ml. of diglyme was hydroborated with 10 percent excess diborane by adding 13.8 ml. of 1 molar sodium borohydride in diglyme and a solution of 2.32 ml. boron trifluoride etherate in 2 ml. of diglyme. Excess hydride in the system was destroyed with 50 ml. of methanol and the mixture was then cooled to 0 to 5° C. Then, 10 ml. of 5 molar aqueous silver nitrate was added to the reaction mixture and subsequently 20 ml. of 5 molar methanolic potassium hydroxide (100 mmoles) was added over a period of 10 minutes. A temperature surge, during the addition, to 18° C. occurred even though an attempt was made to maintain the reaction temperature at 0 to 5° C. The mixture was agitated and reacted for 2 hours at which time a sample was taken which was analyzed by vapor phase chromatography showing that an 80 percent conversion to 4,7-dimethyldecane was obtained. Allowing the reaction mixture to react at room temperature overnight with agitation, the conversion was increased to 85 percent.

EXAMPLE XXII

Tri-n-hexylborane was prepared by reacting a mixture of 50 mmoles of the hexene and 14.89 mmoles of n-nonane with the 10 percent excess of diborane to give a solution of tri-n-hexylborane in 30 ml. of diglyme. After the excess hydride was destroyed at room temperature by adding 20 ml. of methanol, 50 ml. of a 2 molar methanolic potassium hydroxide solution was added with cooling to maintain the temperature at 25 to 30° C. Then, 10 ml. of a 5 molar aqueous silver nitrate solution was added over a 10 minute period. The reaction mixture was stirred while maintaining the temperature at 25 to 30° C. and after 2 hours reaction, a 75 percent conversion to dodecane was obtained.

It is possible to couple hydrocarbon groups containing one or more substituents which are essentially inert to the reaction, such as hydroxy groups, alkoxy, phenoxy, carboxy, carboethoxy, nitro, amino, trifluoromethyl, carbonyl, etc.

EXAMPLE XXIII

Following Example II, 50 mmoles of anethole was hydroborated in diglyme, methanol added, and treated with potassium hydroxide and silver nitrate. There was obtained a 40 percent yield of the dimethyl ether of hexoesterol.

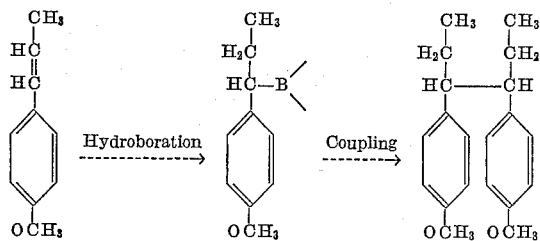

Similarly, employing the procedure of Example II, ethylundecenoate is converted into the C-22 dicarboxylic ester.

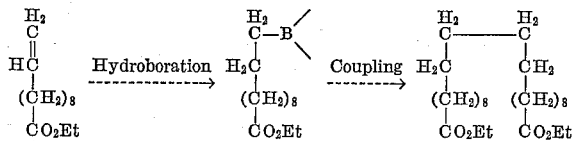

Likewise, methallyl alcohol is converted into the corresponding diol:

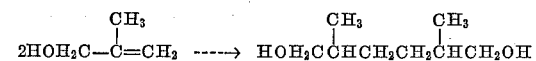

In this reaction, an organoborane obtained by the hydroboration of a diene leads to the formation of ring compounds. In this way, butadiene leads to the formation of cyclobutane, isoprene to the formation of methylcyclobutane, vinylcyclohexene to the formation of 2,2,2-bicyclooctane.

The above examples have been presented by way of illustration and the invention is not intended to be in any way limited thereto. It will now be evident that other group I–B metal compounds, organoboranes, strong bases, solvents, and the like can be substituted.

As illustrated above, uncomplexed inorganic compounds of the group I–B metals are employed in the process of this invention. The compounds can be both anhydrous or hydrated, however. The group I–B metals include the metals copper, silver, and gold. Such compounds can be generally classed as their uncomplexed salts, oxides, and hydroxides. Thus, among the oxides and hydroxides are included silver, copper, and gold oxide and hydroxide. The salts include those of both inorganic and organic acids. While organic acids are generally considered as having a carboxylic acid grouping, it is to be understood that organic compounds not having such groupings, but having strongly acidic hydrogen which form salts with the group I–B metals are equally applicable as, for example, the alcohols and phenols. Among further criteria for selection of the group I–B metal reactants are that they be essentially inert to water or at least only form hydrated systems. Thus, among the group I–B metal reactants are included their salts of inorganic acids as, for example, copper, silver, and gold halides, including the chlorides, bromides, iodides, and fluorides and the sulfides of these metals. Other salts of inorganic acids are those which can be termed as salts of complex inorganic acids containing a chalcogen, namely oxygen or sulfur. By the term complex inorganic acid is intended those inorganic acids which contain at least one of the elements oxygen or sulfur in the anion and additionally contain therein another and different element of the groups III through VI of the periodic chart of the elements capable of forming complex ions with oxygen or sulfur. The non-metallic elements capable of forming complex ions with oxygen or sulfur of the groups III–A, IV–A, V–A, and VI–A are particularly preferred. Such include boron, carbon, nitrogen, silicon, phosphorous, arsenic, selenium, and tellurium. Included among the preferred anions of the complex inorganic acids are those wherein both oxygen and sulfur comprise the anion, e.g. the sulfate anion. Thus, typical examples of such salts include the copper, silver, and gold sulfates, sulfonates, sulfinates, carbonates, nitrates, phosphates (both ortho and meta), pyrophosphates, persulfates, silicates, cyanates, thiocyanates, dithionates, borates (both ortho and meta), selenates, the various arsenates, and the like. Other copper, silver, and gold salts which can be employed but are less preferable include, for example, those in which the anion comprises, in addition to the oxygen or sulfur, certain metals such as those of groups III–B through VI–B and III–A through V–A, for example, silver antimonate, tungstate, chromate, zirconate, molybdate, and the like.

The salts of the organic acids can be further defined as such wherein the silver, gold, or copper is attached to at least one carbon-containing organic radical through an intermediate atom of oxygen or sulfur. For practical reasons, the hydrocarbon portions of such acids will generally contain not more than about 25 carbon atoms, even though higher molecular weight materials can be employed. Illustrative examples of the silver, gold, or copper salts of organic acids include silver formate, silver acetate, silver propionate, silver butanoate, silver octanoate, silver myristate, silver octadecanoate, silver linoleoate, silver butyrate, silver ethylate, silver phenolate, silver benzoate, silver thiophenolate, silver naphthenate, silver thioacetate, silver isobutyrate, silver propoxide, and the like and corresponding compounds of copper and gold. It is to be understood that the hydrocarbon portions of such organic acid salts can be further substituted to result in branched chain isomers or substituted with functional groups such as the hydroxy, keto, and the like groups, provided such are essentially inert in the reaction. The silver, gold, and copper salts, particularly the silver salts, of the lower alkanoic acids, especially those having up to about 8 carbon atoms in the hydrocarbon portions, are preferred salts of organic acids because of their greater availability, economy, solubility in the reaction system, and higher yields obtained.

The above grouping of the group I–B metal reactants is not intended to indicate that the various classes or even members of the classes are equivalent type materials since some exhibit particular and unique advantages over others, especially in resulting in greater yields. For example, in certain instances, the group I–B metal reactants preferred are those which are completely miscible in the reaction system. In a particular embodiment of the invention, the group I–B metal oxides, hydroxides, and nitrates, are preferred because of their greater availability, economy, and higher yields obtained. Of these compounds, silver oxide, silver nitrate, and silver hydroxide, are especially effective in the formation of free radicals.

The boron reactant is an organoboron compound, particularly hydrocarbon boron compounds, which have at least one carbon to boron linkage. The carbon to boron linkage is the primary requisite of this reactant since this linkage is what is reacted in the process forming the free radical which, as a general rule, couples. The remaining valences of the boron can be other ligands including those which are reactive to water provided that they do not destroy the reactivity of the carbon to boron linkages. Thus, such other ligands can be, for example, moieties such as the hydrocarbon radicals, alcohol residues (OR), hydrogen, halogens, hydroxyl groups, inorganic acid anions, organic acid anions, particularly of the alkanoic acids, salt structures, (—OM), particularly where "M" is an alkali metal, and the like. It is preferable, however, that such other ligands be selected from the same or different hydrocarbon radicals, and hydroxyl groups. Thus, included among the organoboron reactants employed in the process of this invention are the trialkylboranes as, for example, trimethylborane, triethylborane, tributylborane, tri-3-methylbutylborane, tri-4-methylpentylborane, trihexylborane, trioctylborane, tridecylborane, triundecylborane, tridodecylborane, trioctadecylborane, trieicosylborane, tri-triacontylborane, tri-tetracontylborane, and the like; trialkenylboranes, as for example, trivinylborane, tri-1-butenylborane, tri-2-octenylborane, trioctadecenylborane, tri-triacontenylborane, and the like; alkynylboron compounds as, for example, tri-1-hexynylborane, tri-2-octynylborane, and the like; cycloalkyl- and cycloalkenylboron compounds as, for example, tricyclobutylborane, tricyclohexylborane, tricyclooctylborane, tricyclobutenylborane, tricyclohexadienylborane, and the like; arylboron compounds as, for example, triphenylborane, trinaphthylborane, tri-(2-phenylethyl)borane, tribenzylborane, tritolylborane, and the like; mixed organoboranes as, for example, methyl-diethylborane, octyl-dihexylborane, phenyl-dioctadecylborane, and the like; cyclic or polymeric hydrocarbon boron compounds as, for example, butane-1,4-bis(1-boracyclopentane),

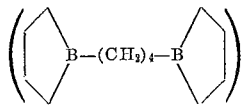

pentane-1,5-bis(1-boracyclohexane); 1-n - butylboracyclohexane; 1-n-butylboracyclopentane; compounds having the moiety

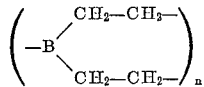

wherein $n$ is at least 2; and the like; hydrocarbon boron acids as, for example, benzyl boronic acid, ethyl boronic acid, phenyl boronic acid, dioctadecyl boronous acid, and the like, and their corresponding salts of metals, particularly the alkali metals as, for example, sodium, lithium, potassium, and cesium, hydrocarbon boron halides as, for example, dihexylboron chloride, dioctadecylboron fluoride, dioctylboron bromide or iodide, and the like; hydrocarbon borines as, for example, dihexylboron hydride, tetradecyl diborane, and the like; and hydrocarbon boron compounds also containing inorganic and organic acid anions as, for example, dihexylboron sulfate, dihexylboron nitrate, dihexylboron acetate, dihexylboron octadecanoate, and the like. Another type of cyclic organoboron compound also employable are those illustrated by, for example, trimethyl boroxine (MeBO)₃, trihexyl boroxine, trioctadecyl boroxine, and the like. The above compounds are presented by way of illustration and it is not intended to be limited thereto. In general, the hydrocarbon moieties contained in such compounds will have up to and including about 40 carbon atoms. It is to be understood that the hydrocarbon groups can be further substituted to result in branch chains and isomers thereof as well as being substituted by other functional groups which are essentially inert in the reaction or do not defeat the desired free radical formation. Examples of such functional groups include one or more hydroxy, alkoxy, phenoxy, carboxy, carboalkoxy, nitro, amino, trihalomethyl, carbonyl, and the like positioned at any location of a carbon chain or ring. It is preferable, however, to employ trihydrocarbon boranes, especially the trialkylboranes in which the alkyl groups are preferably straight or branched chain hydrocarbon groups having up to and including about 40 carbon atoms. The trialkylboranes in which the alkyl groups are preferably straight or branched chain hydrocarbon groups having up to and including 8 carbon atoms are more especially preferred since they are more easily prepared, more stable and economical, and result in the greatest practical production of free radicals and coupled products resulting therefrom. Likewise, such trialkylboranes unexpectedly produce higher yields than other organoboron reactants.

As indicated and illustrated above, the reaction between the group I–B metal compound and the organoboron compound is conducted in the presence of a strong base. In preferred embodiments such strong bases are compounds which normally have a pH of 9 or higher in a dilute aqueous solution such as 0.1 molar. While many strong bases equivalent to those illustrated above can be employed, in general, such bases are the hydroxides, alkoxides, amides, or alkyls of the group I–A and II–A metals, or the quaternary ammonium hydroxides. Typical examples of the metal hydroxides include the group I–A metal hydroxides as, for example, lithium, sodium, potassium, rubidium, and cesium hydroxide, and the group II–A metal hydroxides as, for example, beryllium, magnesium, calcium, strontium, and barium hydroxide. Typical examples of such alkoxides include, for example, sodium methylate, potassium ethylate, lithium isopropoxide, magnesium butylate, strontium octylate and the like alkoxides, preferably wherein the alcohol residue has up to and including about 8 carbon atoms. Typical examples of the amides include lithium, sodium, potassium, rubidium, magnesium, calcium, or barium amide. The alkyls of the group I–A and II–A metals will preferably contain up to about 8 carbon atoms although higher carbon atom materials can be employed. Typical examples of the group I–A and II–A metal alkyls include ethyl sodium, ethyl potassium, or ethyl lithium; amyl sodium, potassium, rubidium, or lithium; octyl sodium, potassium, rubidium, or cesium; diethyl calcium, magnesium, strontium, or barium, and the like. The quaternary ammonium hydroxides are also subject to considerable latitude although, in general, the tetraalkyl ammonium hydroxides, especially wherein the alkyl groups contain up to about 8 carbon atoms, are preferred. Typical examples of such quaternary ammonium hydroxides include tetramethyl, tetraethyl, tetrapropyl, tetrabutyl, tetraoctyl, benzyltrimethyl, and the like quaternary ammonium hydroxides. Other strong bases, such as the guanidines may be used. Of the strong bases, the alkali metal hydroxides, especially sodium and potassium hydroxides, are preferred because of their greater availability, economy, and enhanced yields obtained.

The proportions of the reactants described above are subject to considerable latitude. However, for the most effective operation, as indicated above, it is preferable to employ at least one mole of the group I–B metal compound for each carbon to boron linkage in the organoboron reactant. Generally, not more than about 2 moles of the group I–B metal compound per carbon to boron bond are employed or required even though higher ratios can be used. Likewise, it is preferable to employ at least 1 mole of the strong base for each carbon to boron linkage in the organoboron compound and for each mole of the group I–B metal reactant when this reactant is a compound other than its oxide or hydroxide. While higher amounts can be employed, generally not more than 2 moles of the base for each carbon to boron bond and each mole of group I–B metal other than an oxide or hydroxide is employed as a practical matter.

As indicated in the above examples, diverse types of solvents can be employed, if desired, in performing the process of this invention. Among the criteria for selection of such solvents are that they be essentially inert in the reaction system and preferably liquid at standard conditions, as well as liquid under the reaction conditions employed. By the term "inert," it is intended to denote that the solvents do not degrade the carbon to boron bond in the organoborane nor unduly inhibit the desired reaction of forming free radicals and ultimately the desired coupled product. Such solvents can be either organic solvents or water. A further criterion of choice is that it is preferable that they exhibit solubility for at least the organoboron reactant and most desirably dissolve all of the reactants. Thus, among the organic solvents employable are included the hydrocarbons, ethers, amines, organic halides, formamides, sulfoxides, and alcohols, preferably of the saturated or aromatic types. Typical examples of the hydrocarbons include the pentanes, hexanes, octanes, nonanes, cyclohexane, benzene, toluene, xylene, and the like. Typical examples of the ethers include the propyl ethers, amyl ethers, hexyl ethers, diphenyl ethers, benzyl ethers, ethyl benzyl ethers, tetrahydrofuran, tetrahydropyran, and especially the ethers of polyols as, for example, dioxane, dimethoxy ethane, the dimethyl and diethyl ethers of diethylene glycol, the dimethyl and diethyl ethers of diethylene, triethylene, and tetraethylene glycols, trimethyl glycerol and the like; amines such as the butyl amines, amyl amines, piperidine, pyrrolidine, dipropylamine, ethylene diamine, n-hexyl amine, cyclohexyl amine, aniline, the toluidines, methyl aniline, and especially the tertiary amines, as for example, trimethylamine, triethylamine, pyridine, diethyl aniline, and the like. Among the organic halides are included, for example, the propyl, butyl, and amyl chlorides, bromides, and iodides, cyclohexyl chloride, benzyl chloride, n-octyl chloride, the chlorotoluenes, chloroform, 1,1,1-trichloroethane, carbon tetrachloride, trichloroethylene, tetrachloroethylene, 1,1,1,2- or 1,1,2,2-tetrachloroethane, and the like. Typical examples of the formamides include formamide, dimethylformamide, diethylformamide, diphenylformamide, and the like. Included among the alcohols are, for example, ethanol, propanol, butanol, the amyl alcohols, cyclohexanol, cyclobutanol, and polyols as, for example, ethylene glycol, propylene glycol, triethylene glycol, and the like. Typical examples of the sulfoxides include dimethylsulfoxide, diethylsulfoxide, dibutylsulfoxide, diphenylsulfoxide, and the like. Water and methanol are highly effective solvents to be employed and comprise especially preferred embodiments. The protonic type solvents, e.g. the alcohols and water are preferred over other type solvents. It is to be understood that mixtures of the foregoing solvents can be employed. In this connection, mixtures of water and ethers, especially the polyethers, such as the dimethyl ether of diethylene glycol and the diethyl ether of diethylene glycol, have been found very effective in promoting the reaction as well as providing efficient fluid reaction systems. The proportion of solvent employed is not critical and subject to considerable latitude. For example, as much as 1 part by weight per part by weight of the organoboron reactant can be employed and as high as 100 parts of the solvent per part by weight of the organoboron compound are applicable. As a practical matter, generally only a sufficient amount of solvent is employed to provide a fluid reaction system and ordinarily an equal volume of solvent to reactants is suitable.

The temperature and pressure conditions at which the reaction is conducted are also subject to considerable latitude. In general, temperatures as low as —20° C. and lower up to the decomposition temperature of the reactants or products are applicable. However, as a practical matter, temperatures in the range of 0 to 100° C. are employed and temperatures between 0 to 35° C. are preferred for best results. The pressure of the system is not critical and can be varied from subatmospheric to superatmospheric although generally atmospheric or autogenous pressure is employed and preferred.

The length of reaction can also be varied. While in most instances the reaction is complete within about 2 hours, generally reaction times from 1 to 10 hours can be used.

The process of this invention is of considerable utility. As the above examples have clearly demonstrated, one utility of the invention is the coupling of the free radicals generated to form various types of hydrocarbon or functionally substituted hydrocarbon products. It is of particular significance to especially note a few specific applications. For example, by the process of this invention, one can take acetylenic compounds, such as acetylene, monohydroborate these compounds as illustrated in Example II, and then perform the process of the present invention to result in a diene product, e.g. acetylene is converted to butadiene as illustrated in Example XVI. Further, a diene such as butadiene, or 1,3-pentadiene can be fully hydroborated and then reacted according to the process of the present invention to produce the cyclic compound, cyclobutane, or methylcyclobutane. Likewise, by a similar technique of hydroboration and coupling, 4-vinyl-1-cyclohexene can be converted to 2,2,2-bicyclooctane.

Another highly effective application of the process of this invention is the use of the free radical initiating system described above as catalysts for polymerization or copolymerization of olefins, including monoolefins such as ethylene, propylene, butylene, styrene, and the like; diolefins, such as butadiene, 1,3-pentadiene, and the like; and other olefinic materials such as acrylic acid, methyl methacrylate and the like. In such application of the process of this invention one need only add the desired olefin to the reaction system, for example, prior to addition of the base and conduct the reaction under conditions suitable for polymerizing the specific olefin. Thus, styrene and acrylonitrile undergo polymerization at 0–25° C., whereas ethylene requires high pressures and temperatures of 100–200° C. Thus, the free radical initiating system of the present invention is an excellent catalytic system for such polymerization operations. By way of example, one can add a mixture of 28 weight percent butadiene and 72 weight percent styrene to the hereinabove described reaction system, especially employing temperatures of 0 to —20° C., to produce a copolymer of styrene and butadiene, commonly referred to as "cold rubber."

Another particular use of the present method of initiating free radicals is in substitution reactions. For example, amines, especially tertiary amines, having a highly active hydrogen can be alkylated quite readily by incorporating the material to be alkylated into the reaction system. By way of illustration, when the procedure of Example I is repeated with exception that pyridine is added in essentially stoichiometric amount to the triethylborane, ethyl pyridine is obtained in high yield.

A still further use of the free radical generation method of the present invention is in addition reactions. By way of example, when the process of this invention is conducted in the further presence of a stoichiometric amount, based upon the free radicals generated, of carbon monoxide or sulfur dioxide, the corresponding ketones and sulfonyl compounds are obtained. By way of illustration, when the procedure of Example I is repeated essentially as described with exception that carbon monoxide is pressurized into the reactor, diethylketone is obtained. When Example I is repeated with exception that sulfur dioxide is pressurized into the reactor, the corresponding diethyl sulfonyl compound is obtained.

Another effective use of the process of the invention comprises hydrogen abstraction reactions. In this utility, organic compounds having a highly active hydrogen can be reacted to form coupled products thereof. A typical example of this utility comprises the duplication of Example I adding cumene to the reaction system just prior to the addition of the alkali metal hydroxide and proceding as described, 2,3-diphenyltetramethylethane is obtained. Similarly, by initially adding acetic acid to the system of Example I, 2,3-dicarboxy butane is obtained in good yield. Other examples of such hydrogen abstraction will now be evident.

An even further use of the present invention comprises halogen abstraction reactions wherein polyhalo compounds are employed. By way of example, when Example I is repeated including, initially in the reaction system, essentially a stoichiometric amount of carbon tetrachloride, ethyl chloride, and hexachloroethane are produced in good yield.

Another highly effective use of the instant free radical generating procedure is in sulfur abstraction resulting in thioethers. By way of illustration, when a diorgano disulfide, especially dialkyl disulfide is incorporated into the reaction mixture of Example I prior to addition of the metal hydroxide, the corresponding thioether is obtained, e.g. with di-n-propyl disulfide, ethyl propyl thioether is the product.

A still further use of the present invention is the employment of the reaction system as a catalyst for additions to olefins and acetylenes. By way of example, the system catalyzes the anti-Markownikoff addition of hydrogen halides to olefins or acetylenic compounds. A typical example is illustrated by adding 1-butene and hydrogen bromide to the reaction system of Example I, again just prior to addition of the alkali metal hydroxide, and then conducting the reaction as described whereby 1-bromobutane is obtained. Another typical example is to add carbon tetrachloride and 1-butene to the reaction system of Example I whereby 1,1,1,3-tetrachloropentane is produced.

Another particular use of the process of this invention comprises a new method for forming metal alkyls at low temperatures. In this embodiment, the metal is added to the hereinbefore described reaction system preferably in an activated form by grinding, chemical treatment, or the like. A typical example of this use comprises the addition of by-product lead from the present commercial method for producing tetraethyllead to the reaction system of Example I, generally prior to the addition of the metal hydroxide, and then proceeding with the reaction as described. In this manner, a good yield of tetraethyllead is obtained.

Other uses of the novel method for generating free radicals will now be evident.

Having thus described the process of this invention, it is not intended that it be limited except as set forth in the following claims.

I claim:

1. A method for generating free radicals and their reaction products which comprises reacting a hydrocarbon boron compound having at least one boron to carbon linkage with an uncomplexed inorganic compound of a group Ib metal in the presence of a strong base which is characterized by having a pH of above about 9.

2. A method for generating free radicals and their reaction products which comprises reacting a trialkylborane with a group I–B metal nitrate and an alkali metal hydroxide having a pH of above about 9 at a temperature between about 0 to 100° C.

3. The process of claim 2 wherein said trialkylborane is triethylborane, said group I–B metal nitrate is silver nitrate, and said alkali metal hydroxide is sodium hydroxide.

4. The process of claim 3 further characterized in that the reaction is conducted in the presence of an essentially inert solvent at a temperature between about 0 to 35° C.

5. A method for the production of n-butane which comprises reacting essentially 1 mole of triethylborane with at least one mole of silver nitrate and at least one mole of sodium hydroxide for each carbon to boron linkage in said triethylborane in the presence of water at a temperature between about 0 to 35° C.

6. A method for generating free radicals and their reaction products which comprises reacting a trialkylborane with a group I–B metal nitrate and an alkali metal hydroxide having a pH of above about 9 at a temperature between about 0 to 100° C., each alkyl group of said trialkylborane containing up to and including about 8 carbon atoms.

7. The method of claim 6 wherein the group I–B metal nitrate is silver nitrate.

8. The method of claim 6 further characterized in that the reaction is conducted in a protonic solvent.

9. The method of claim 6 further characterized in that the reaction is conducted in water.

10. The method of claim 1 wherein said hydrocarbon boron compound is a trialkyl borane.

11. A method of generating free radicals and their reaction products which comprises reacting a trialkyl borane with a group Ib metal compound in the presence of a strong base having a pH of above about 9.

12. A method for coupling unsaturated compounds which comprises hydroborating an unsaturated compound and thereafter treating the hydroborated product with an uncomplexed inorganic compound of a group Ib metal in the presence of a strong base characterized by having a pH of above about 9.

13. The method of claim 12 wherein said uncomplexed inorganic compound is silver nitrate.

14. The method of claim 12 wherein said strong base is an alkali metal hydroxide.

15. The method of claim 12 wherein said strong base is sodium hydroxide.

References Cited in the file of this patent

UNITED STATES PATENTS

| 2,441,249 | Ocon et al. | May 11, 1948 |
| 2,927,086 | Gordon et al. | Mar. 1, 1960 |

OTHER REFERENCES

Johnson et al.: "J. Am. Chem. Soc." (1938), vol. 60, pp. 111–115.

Bawn et al.: "J. Chem. Society" England, Oct. 1960, pp. 3923–3931.

UNITED STATES PATENT OFFICE
CERTIFICATE OF CORRECTION

Patent No. 3,134,823                                                        May 26, 1964

Herbert C. Brown

It is hereby certified that error appears in the above numbered patent requiring correction and that the said Letters Patent should read as corrected below.

Column 3, Table I, heading to the sixth column thereof, for "$C_4H_{16}$" read -- $C_4H_{10}$ --; line 26, for "a", first occurrence, read -- at --; columns 3 and 4, Table II, under the heading "Solvent System (ml.)" and opposite "Run No. V", for "$H_2NC_2NH_4N_2(50)$" read -- $H_2NC_2H_4NH_2(50)$ --; same Table II, under the heading "Conversion", the second sub-heading, for "Percent hexene" read -- Percent hexane --.

Signed and sealed this 15th day of December 1964.

(SEAL)
Attest:

ERNEST W. SWIDER                                       EDWARD J. BRENNER
Attesting Officer                                              Commissioner of Patents